United States Patent [19]

Krause

[11] Patent Number: 4,982,922

[45] Date of Patent: Jan. 8, 1991

[54] LOAD SECUREMENT ASSEMBLY

[76] Inventor: Theodore Krause, 201 Mariners Way, Copaigue, N.Y. 11726

[21] Appl. No.: 451,525

[22] Filed: Dec. 18, 1989

Related U.S. Application Data

[63] Continuation-in-part of Ser. No. 206,817, Jun. 15, 1988, abandoned.

[51] Int. Cl.⁵ .............................................. B60P 7/00
[52] U.S. Cl. ............................... 248/222.2; 248/221.4; 248/222.1; 410/143
[58] Field of Search .................. 248/222.2, 222.1, 251, 248/225.1, 221.4; 410/143, 149, 150

[56] References Cited

U.S. PATENT DOCUMENTS 3,367,286 2/1968 Jantzen ......................... 248/222.2 X
4,340,144 7/1982 Cousins ......................... 248/222.2 X
4,413,761 11/1983 Angel ................................. 211/86 X

FOREIGN PATENT DOCUMENTS 1375034 11/1974 United Kingdom ............. 248/222.2

Primary Examiner—Alvin C. Chin-Shue
Attorney, Agent, or Firm—Michael I. Kroll

[57] ABSTRACT

A load securement assembly is provided and consists of a pair of brackets which are each mounted into an E-track belt rail on an opposite side wall of a trailer so as to accept a beam therebetween to hold articles in place during transportation in a railroad environment.

1 Claim, 1 Drawing Sheet

LOAD SECUREMENT ASSEMBLY

CROSS REFERENCE OF RELATED APPLICATIONS;

This patent application is a continuation-in-part of copending patent application S.N. 206,817, filed 15 June 1988.

BACKGROUND OF THE INVENTION

1. Field of the Invention

The present invention relates generally to damage prevention devices and more specifically it relates to a load securement assembly.

2. Description of the Prior Art

Numerous devices have been provided in the prior art such as taught by the U.S. Pat. No. 3,367,286 to Jantzen and U.S. Pat. No. 4,413,761 to Angel that are adapted to be used. Even though these innovations may be suitable for the specific individual purposes to which they address, they would not be suitable for the purposes of the present invention as heretofore described.

SUMMARY OF THE INVENTION

A primary object of the present invention is to provide a load securement assembly that will overcome the shortcomings of the prior art devices.

Another object is to provide a load securement assembly that will hold articles in place within a trailer during transportation.

An additional object is to provide a load securement assembly that includes a pair of brackets which are each mounted onto an E-track belt rail on an opposite side wall of the trailer so as to accept a laminated beam therebetween to hold the articles in place during transportation in a railroad environment.

A further object is to provide a load securement assembly that is simple and easy to use.

A still further object is to provide a load securement assembly that is economical in cost to manufacture.

Further objects of the invention will appear as the description proceeds.

In keeping with these objects, and with others which will become apparent hereinafter, one feature of the present invention resides, briefly stated, in A load securement assembly for a trailer storing articles, the load securement assembly comprising a pair of flat tracks having a substantially flat center and being affixed to opposite side walls of the trailer and mounted directly on the trailer side walls so that the trailer side walls do not have to be removed and replaced when mounting the pair of tracks, a pair of one piece brackets, each of which is mounted onto one of the tracks, each of the brackets further including a rear wall having a plurality of resilient vertical fingers disposed thereon, the resilient vertical fingers sized to fit into vertical slots in one of the tracks and be held thereto, each of the resilient fingers having a lower tab with a lower notch and an upper tab with a larger upper notch so that the one piece bracket can be tip forward and insert the upper tab into the slot and raised up until the notch bottoms out, at which time the lower tab is inserted into the slot and then lowered until the lower notch bottoms out and a box-like housing extending from the rear wall, the housing having a front opening and a top opening thus forming a holding area therein to receive one end of the beam member, an elongated laminated beam member extending between the brackets so as to bear against the articles, the elongated laminated beam member carrying more load than a solid beam of even greater dimensions, the laminated elongated beam member comprises at least two rectangular boards laminated together along their longer sides so that the boards are turned onto their longer sides when the ends are received within the holding areas of the brackets, and means for keeping the beam member within the brackets so that the load securement assembly will hold the articles in place during transportation of the trailer, the beam member keeping means include a pair of bolts, each of which extending through sides of the housing directly above and not through the end of the beam member to prevent the end of the beam member from weakening and damaging and leaving the holding area of the bracket during transportation of the trailer To the accomplishment of the above and related objects, this invention may be embodied in the form illustrated in the accompanying drawings, attention being called to the fact, however that the drawings are illustrative only, and that changes may be made in the specific construction illustrated and described within the scope of the appended claims.

LIST OF REFERENCE NUMERALS UTILIZED IN THE DRAWING

Figure 1:
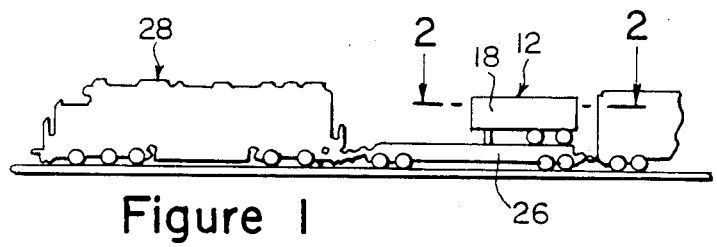
FIG. 1 is a side view of the railroad train with a trailer upon a flatcar of the train.
Figure 4:
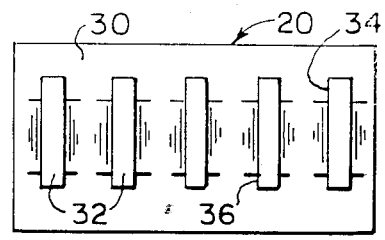
FIG. 4 is a rear view of one of the brackets.

10 - load securement assembly
12 - trailer
14 - articles
16 - E-track belt rails
18 - side walls of trailer
20 - pair of brackets
22 - elongated beam member
24 - pair of bolts
26 - flatcar
28 - train
30 - rear wall
32 - resilient vertical fingers
33 - vertical slots
34 - larger upper notch of finger
36 - lower notch of finger
38 - box-like housing
40 - front opening of housing
42 - top opening of housing
44 - holding area
46 - one end of beam member
48 - sides of housing
50 - rectangular boards
52 - lamination
54 - nails

DETAILED DESCRIPTION OF THE PREFERRED EMBODIMENT

Turning now descriptively to the drawings, in which similar reference characters denote similar elements throughout the several views, the figures illustrate a load securement assembly 10 for a trailer 12 storing articles 14, such as steel drums or the like. The trailer 12 has a pair of E-track belt rails 16 affixed to opposite side walls 18 therein.

The load securement assembly 10 consists of a pair of brackets 20, an elongated beam member 22 and a pair of bolts 24. Each of the brackets 20 is mounted onto one of the E-track belt rails 16 with the beam member 22 extending between the brackets 20 so as to bear against the articles 14. The bolts 24 keep the beam member 22 within the brackets 20 so that the load securement assembly 10 will hold the articles 14 in place during transportation of the trailer 12.

As shown in FIG. 1, the trailer 12 can be placed onto a flatcar 26 of a train 28. The application of the load securement assembly 10 can also be used in any transportation environment where a trailer 12 is used.

Figure 5:
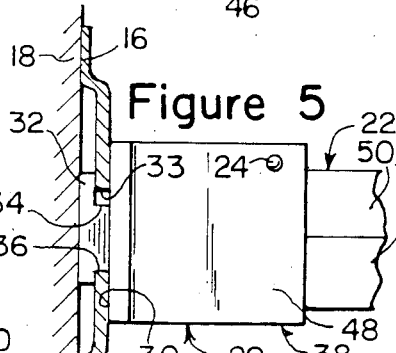
FIG. 5 is a side view of one of the brackets into an E-track belt rail.
Figure 6A:
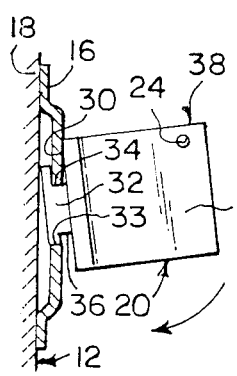
FIGS. 6A and 6B are side views showing how the resilient fingers of the bracket are placed within the slots of the E-track belt rail.
Figure 6B:
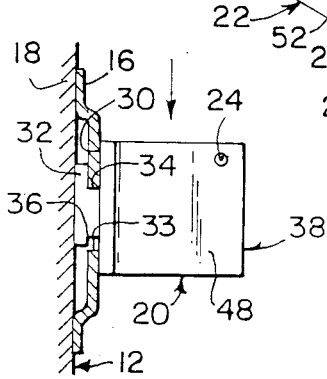

Each bracket 20 includes a rear wall 30 having a plurality of resilient vertical fingers 32 disposed thereon whereby the resilient fingers 32 are sized to fit into vertical slots 33 in on of the E-track belt rails 16 and be held thereto. Each vertical finger 32 has a lower notch 36 and a larger upper notch 34 to accomplish this as shown in FIGS. 6A, 6B and 5. A box-like housing 38 extends from the rear wall 30 and has a front opening 40 and a top opening 42, thus forming a holding area 44 therein to receive one end 46 of the laminated beam member 22.

Each of the bolts 24 extends through sides 48 o the housing 38 directly above and not through the end 46 of the beam member 22 to prevent the end 46 of the beam member 22 from leaving the holding area 44 of the bracket 20 during transportation of the trailer 12.

Figure 2:
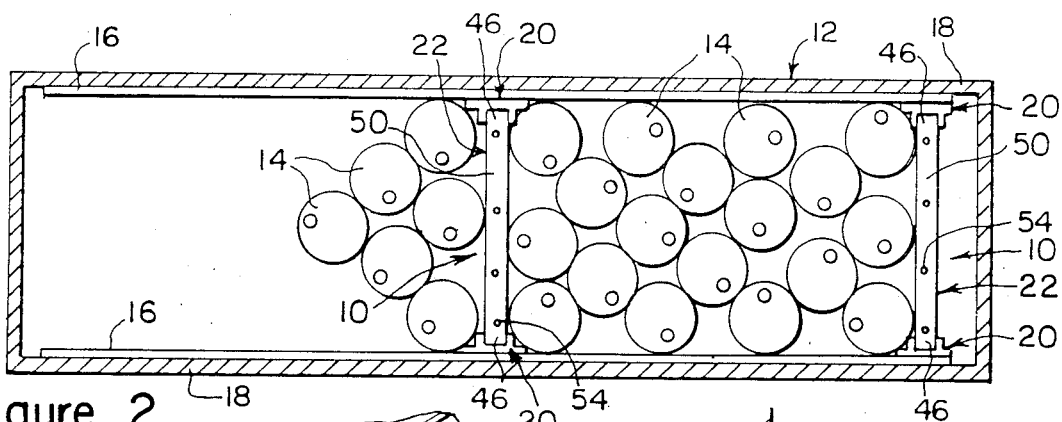
FIG. 2 is a cross sectional view taken along line 2—2 in FIG. 1, showing the invention mounted within the trailer.
Figure 3:
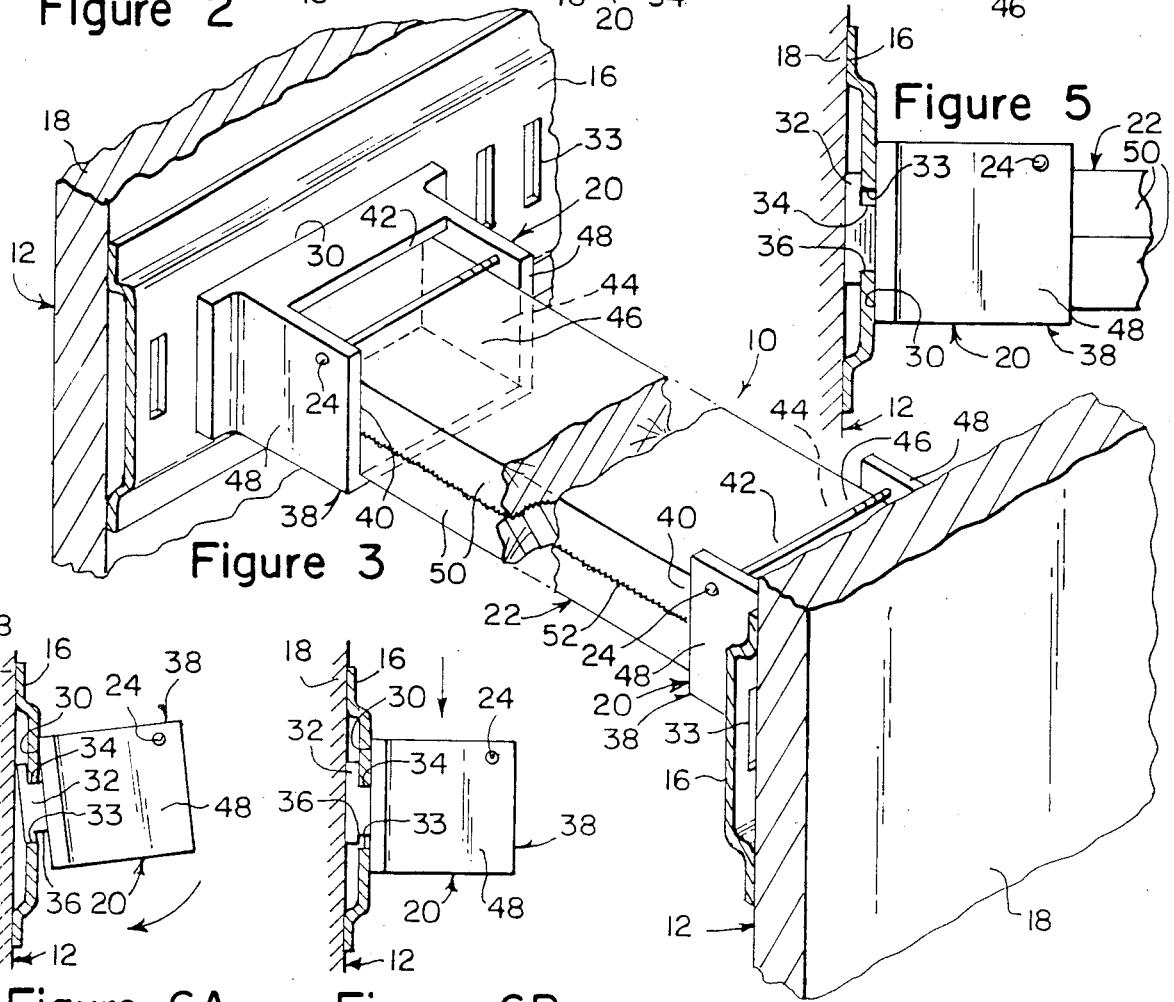
FIG. 3 is a perspective view with parts broken away of the present invention.

The laminated beam member 22 contains at least two rectangular boards 50, such as a pair of 2×6's affixed together along their longer sides so that the boards 50 are turned onto their longer sides when the ends 46 are received within the holding areas 44 of the brackets 20. The boards 50 can be affixed together by lamination 52, as shown in FIG. 3, or by a plurality of nails 54 therethrough, as shown in FIG. 2.

It will be understood that each of the elements described above, or two or more together, may also find a useful application in other types of constructions differing from the type described above.

While the invention has been illustrated and described as embodied in a load securement assembly, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In combination a load securement assembly and a trailer for storing articles and having a pair of opposite side walls, said load securement assembly, comprising:
   (a) a pair of tracks each containing a plurality of vertical slots and a substantially flat center, said each of said pair of tracks being affixed to the opposite side walls of the trailer, said pair of tracks being mounted directly onto the pair of opposite trailer side walls so that the pair of opposite trailer side walls do not have to be removed and replaced when mounting said pair of tracks, said pair of tracks being mountable to any type of wall whether it be solid or hollow;
   (b) a pair of one piece brackets each of which is mounted onto one of said pairs of tracks, each of said brackets further including a rear wall having a plurality of resilient vertical fingers disposed thereon with each of said resilient fingers abutting both a side wall and a bracket whereby said plurality of resilient vertical fingers are sized to snugly fit into said plurality of vertical slots in said each of said pair of tracks and being held thereto, each of said plurality of said resilient fingers having a lower tab with a lower notch and an upper tab with a larger notch, said lower tab and said upper tab forming together a substantially "T"-shape so that said resilient fingers are less breakable, said each of said pair of said one piece brackets are tipped forward and inserts said upper tab into said plurality of said slots and raised up until said upper notch bottoms out at which time said lower tab is inserted into said plurality of said slots and lowered until said lower notch bottoms out so that said each of said pair of one homogeneous piece brackets are installed and removed resiliently and are further void of the need for any mechanical releases, and a box-like housing extending from said rear wall;
   (c) an elongated laminated beam member having ends and longer sides extending between said pair of brackets so as to bear against the stored articles, said housing having sides a front opening and a top opening thus forming a holding area therein to receive said one end of said elongated laminated beam member; and
   (d) means for keeping said elongated laminated beam member within said brackets so that said load securement assembly holds the articles in place during transportation of the trailer.

* * * * *